(12) United States Patent
Yang et al.

(10) Patent No.: US 11,940,699 B2
(45) Date of Patent: Mar. 26, 2024

(54) ARRAY SUBSTRATE AND LIQUID CRYSTAL DISPLAY PANEL

(71) Applicants: Chongqing HKC Optoelectronics Technology Co., Ltd., Chongqing (CN); HKC CORPORATION LIMITED

(72) Inventors: Yanna Yang, Chongqing (CN); Haijiang Yuan, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 18/090,908

(22) Filed: Dec. 29, 2022

(65) Prior Publication Data

US 2023/0205026 A1      Jun. 29, 2023

(30) Foreign Application Priority Data

Dec. 29, 2021   (CN) .......................... 202111640564.8

(51) Int. Cl.
*G02F 1/1362*   (2006.01)
*G02F 1/1345*   (2006.01)
*G02F 1/1368*   (2006.01)

(52) U.S. Cl.
CPC .... *G02F 1/136286* (2013.01); *G02F 1/13456* (2021.01); *G02F 1/13458* (2013.01); *G02F 1/136227* (2013.01); *G02F 1/1368* (2013.01)

(58) Field of Classification Search
None
See application file for complete search history.

(56) References Cited

U.S. PATENT DOCUMENTS 6,219,124 B1 *   4/2001   Lee ................... G02F 1/136286
                                                      349/147
8,617,910 B2 *  12/2013   Lee ..................... G02F 1/13452
                                                      361/767

\* cited by examiner

*Primary Examiner* — Dung T Nguyen
(74) *Attorney, Agent, or Firm* — Franklin & Associates International Inc; Matthew F. Lambrinos (57) ABSTRACT

Disclosed is an array substrate and a liquid crystal display panel including a display area and a non-display area at the periphery of the display area. The array substrate is provided with a plurality of conductive bonding pads distributed at intervals in the non-display area, in which the conductive bonding pad includes a first metal layer, an insulating layer and a conductive layer sequentially formed on a base substrate, in which the insulating layer is provided with a plurality of vias to electrically connect the conductive layer to the first common electrode, in which the via is provided in a slit shape and is disposed at a predetermined angle from a first direction in which the non-display area surrounds the display area.

18 Claims, 4 Drawing Sheets

ARRAY SUBSTRATE AND LIQUID CRYSTAL DISPLAY PANEL

CROSS-REFERENCE TO RELATED APPLICATIONS

This present application claims priority under 35 U.S.C. § 119 to Chinese patent application No. 202111640564.8 filed on Dec. 29, 2021 before the China National Intellectual Property Administration of the People's Republic of China, entitled "Array Substrate And Liquid Crystal Display Panel", the contents of which is explicitly incorporated herein by reference in its entirety.

FIELD

The present disclosure relates to the field of display technology, particularly to an array substrate and a liquid crystal display panel.

BACKGROUND

A liquid crystal display (LCD) comprises an array substrate and a color film substrate disposed opposite, and a liquid crystal layer between the array substrate and the color film substrate. Wherein, inner sides of the array substrate and the color film substrate are respectively provided with an alignment film for guiding an alignment direction of liquid crystal molecules. In addition, mechanical and electrical connections are achieved between the array substrate and the color film substrate through a sealant in a border area.

Since terrain of a sealant bonding pad on the array substrate side is staggered and grid-like, alignment film droplets are difficult to diffuse, and accumulate here to form a thick film layer, making the conductive particle in the sealant difficult to puncture the alignment film layer so as not to connect the array substrate and the color film substrate, resulting in poor connection of the sealant and abnormal display of the liquid crystal display panel.

SUMMARY

In a first aspect, an embodiment of the present disclosure proposes an array substrate comprising a display area and a non-display area at the periphery of the display area, wherein the array substrate is provided with a plurality of conductive bonding pads distributed at intervals in the non-display area, the conductive bonding pad comprises a first metal layer, an insulating layer and a conductive layer sequentially formed on a first base substrate, the first metal layer is in the same layer with and is electrically connected to a first common electrode in the display area, and the insulating layer is provided with a plurality of vias to electrically connect the conductive layer to the first common electrode, wherein the via is provided in a slit shape and is disposed at a predetermined angle from a first direction that is a direction in which the non-display area surrounds the display area.

In some examples, the predetermined angle α between the via and the first direction has a range of 0≤α<90°.

In some examples, spacing between the two adjacent vias is S, the width of the via is W, and S/(W+S)≥30%.

In some examples, the spacing between the two vias S>5.5 µm; and/or the width of the via W>14.5 µm.

In some examples, the via comprises a first via and a second via, the first via and the second via are disposed symmetrically with respect to a center line of the conductive bonding pad in a second direction which is perpendicular to the first direction.

In some examples, the via further comprises a third via and a fourth via, the third via and the first via are disposed symmetrically with respect to a center line of the conductive bonding pad in the first direction, and the fourth via and the second via are disposed symmetrically with respect to the center line of the conductive bonding pad in the first direction.

In some examples, the conductive bonding pad comprises a plating area and an edge area on at least one side of the plating area, the insulating layer and the conductive layer are located in the plating area, the first metal layer is laid in the plating area and the edge area, and one side of the via toward the edge area is connected with the edge area.

In some examples, the conductive bonding pad comprises a plating area and an edge area on at least one side of the plating area, the insulating layer and the conductive layer are located in the plating area, the first common electrode extends from the display area to the edge area of the non-display area and is electrically connected to the first metal layer to which the via is exposed.

In some examples, the array substrate further comprises a first alignment film on a side of the conductive layer away from the first base substrate and a sealant provided with a conductive particle, wherein the conductive particle is accommodated in the via, one end of the conductive particle is electrically connected to the first common electrode through the first alignment film, and the other end of the conductive particle is electrically connected to a second common electrode through a second alignment film on a color film substrate side of the liquid crystal display panel.

In a second aspect, an embodiment of the present disclosure further provides a liquid crystal display panel comprising the array substrate as previously described; a color film substrate disposed opposite the array substrate; and a liquid crystal layer disposed between the array substrate and the color film substrate.

In the array substrate and the liquid crystal display panel according to embodiments of the present disclosure, by patterning the conductive bonding pad in the non-display area, i.e., providing a plurality of the vias in a slit shape distributed at intervals on the insulating layer of the conductive bonding pad, and disposing the via at a predetermined angle from a direction in which the non-display area surrounds the display area, the array substrate can prompt the droplets of the alignment film to diffuse rapidly at the conductive bonding pad of the non-display area, improve poor connection since the droplets of the alignment film accumulate at the vias to disable the conductive particle in the sealant to puncture the alignment film, and improve abnormal display.

BRIEF DESCRIPTION OF THE DRAWINGS

Features, advantages, and technical effects of exemplary embodiments of the present disclosure will be described below with reference to the accompanying drawings. In the drawings, identical components bear the same reference numerals. The drawings are not drawn to actual scale and are used merely to illustrate relative positional relationships. Some parts are drawn exaggeratedly in layer thicknesses to facilitate understanding, and the layer thicknesses in the drawings do not represent actual layer thicknesses.

DESCRIPTION OF REFERENCE NUMERALS

1: array substrate; AA: display area; NA: non-display area; Px: sub-pixel;

10: conductive bonding pad; 101: plating area; 102: edge area; 11: first base substrate;

12: first metal layer; 121: first common electrode;

13: insulating layer; 13a: gate insulating layer; 13b: passivation layer; 131: via; 131a: first via; 131b: second via; 131c: third via; 131d: fourth via;

14: conductive layer; 15: first alignment film;

16: sealant; 161: conductive particle;

2: color film substrate; 21: second base substrate; 22: second common electrode; 23: second alignment film; 3: liquid crystal layer.

DETAILED DESCRIPTION

Features and exemplary embodiments of various aspects of the present disclosure will be described in detail below. In the following detailed description, numerous specific details are set forth in order to provide a thorough understanding of the present disclosure. However, it will be apparent to one skilled in the art that the present disclosure may be implemented without some of these specific details. The following description of embodiments is merely to provide a better understanding of the present disclosure by illustrating examples of the present disclosure. In the drawings and the description below, at least some of the well-known structures and technologies are not shown in order to avoid unnecessarily obscuring the present disclosure; and for clarity, the dimensions of an area structure may be exaggerated. Furthermore, the features, structures, or characteristics described below may be combined in any suitable manner in one or more embodiments.

Figure 1:
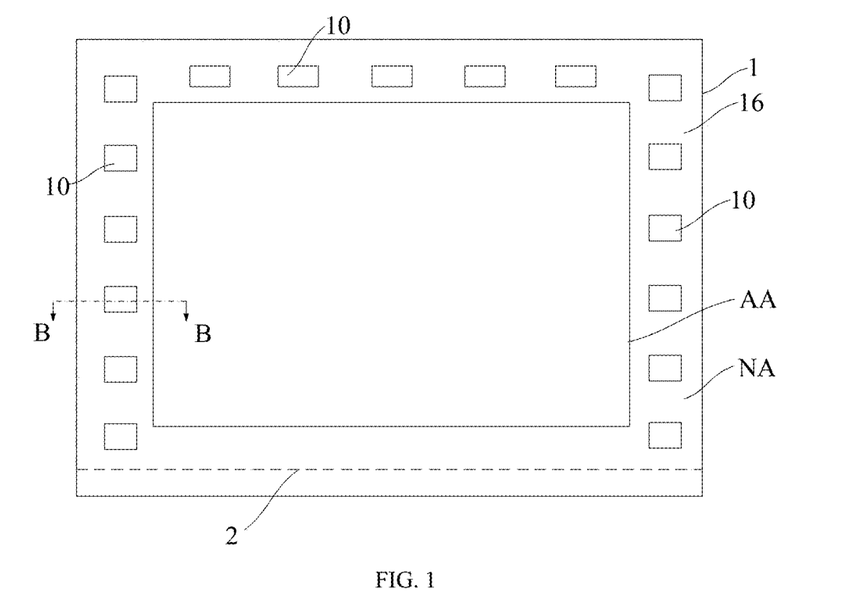
FIG. 1 is a top structural view of a liquid crystal display panel according to an embodiment of the present disclosure.
Figure 2:
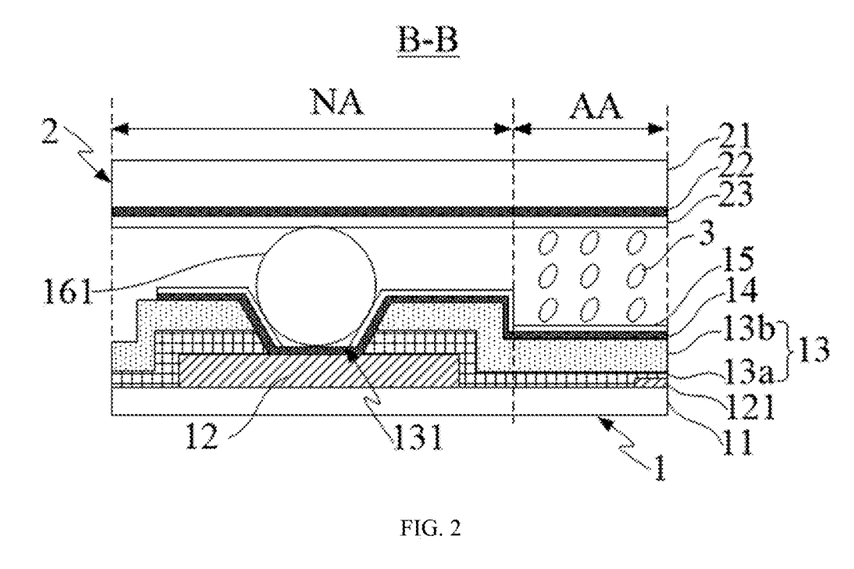
FIG. 2 shows a cross-sectional view of the liquid crystal display panel of FIG. 1 in a B-B direction.

FIG. 1 is a top structural view of a liquid crystal display panel according to an embodiment of the present disclosure; FIG. 2 shows a cross-sectional view of the liquid crystal display panel of FIG. 1 in a B-B direction;

Referring to FIGS. 1 and 2, an embodiment of the present disclosure provides a liquid crystal display panel comprising: an array substrate 1, a color film substrate 2 disposed opposite to the array substrate 1, and a liquid crystal layer 3 disposed between the array substrate 1 and the color film substrate 2. The liquid crystal layer 3 comprises a plurality of liquid crystal molecules generally in a rod shape, which can flow like liquid and have certain crystal characteristics. When the liquid crystal molecules are in an electric field, an alignment direction thereof changes with change of the electric field.

The liquid crystal display panel comprises a display area AA and a non-display area NA at the periphery of the display area AA, and a plurality of conductive bonding pads 10 spaced apart are formed along an enclosure direction of the non-display area NA of the array substrate 1. In a case manufacture process of the liquid crystal display panel, in general, a first alignment film 15 and a second alignment film 23 are manufactured on opposite surfaces of the array substrate 1 and the color film substrate 2 respectively first, and are used to limit orientation of the liquid crystal molecules in the liquid crystal layer 3, then a sealant 16 is coated on a plurality of the conductive bonding pads 10 of the array substrate 1 and dripped into the liquid crystal, next the array substrate 1 and the color film substrate 2 adhere in a vacuum state, and finally the sealant 16 is cured by ultraviolet irradiation to complete packaging of the array substrate 1 and the color film substrate 2.

As shown in FIG. 2, the color film substrate 2 comprises a second common electrode 22 and the second alignment film 23 sequentially formed on the second base substrate 21. A conductive particle 161 is formed in the sealant 16 and accommodated in a via 131 of the conductive bonding pad 10, one end of the conductive particle 161 is electrically connected to the first common electrode 121 through the first alignment film 15, and the other end of the conductive particle 161 is electrically connected to the second common electrode 22 through the second alignment film 23 on one side of the color film substrate 2.

In some examples, the sealant 16 comprises an ultraviolet-curable resin such as an epoxy resin, and a plurality of conductive particle 161 and glass fibers as a conductive material are dispersed therein. The outer diameter of the conductive particle 161 is generally about 5 μm, and the diameter of the glass fiber is generally about 4 μm. In addition, the line width of the sealant 16 is generally about 0.5 mm.

In the related art, the conductive bonding pad 10 is provided with a staggered grid-like via, alignment film droplets are difficult to diffuse outwards through the via, and accumulate here to form a thick film layer, making the conductive particle 161 in the sealant 16 difficult to puncture the alignment film so as not to connect the array substrate 1 and the color film substrate 2, resulting in poor connection of the sealant and abnormal display of the display panel.

To this end, an embodiment of the present disclosure provides the array substrate 1, which can prompt alignment film droplets to diffuse rapidly at the conductive bonding pad 10 in a non-display area NA, improve poor connection since alignment film droplets accumulate here to disable the conductive particle 161 in the sealant 16 to puncture an alignment film, and improve abnormal display.

Specific structures of the array substrate according to embodiments of the present disclosure are described in detail below in combination with the accompanying drawings.

First Embodiment

Figure 3:
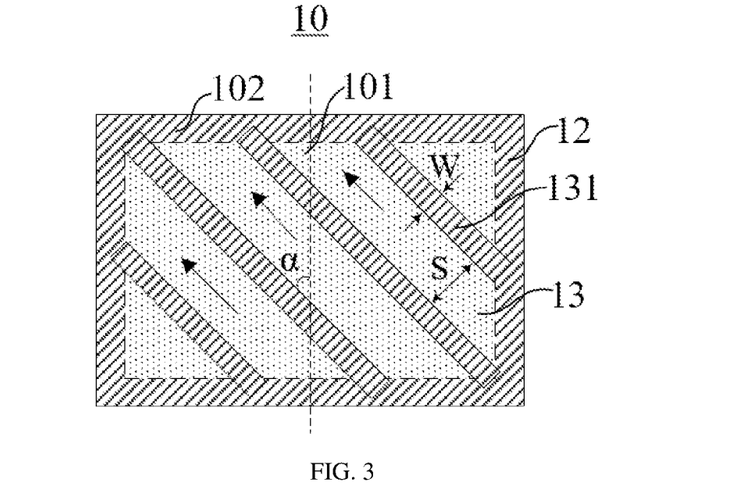
FIG. 3 is a structural diagram of a conductive bonding pad of an array substrate according to a first embodiment of the present disclosure.

FIG. 3 is a structural diagram of a conductive bonding pad of an array substrate according to a first embodiment of the present disclosure.

As shown in FIGS. 2 and 3, the first embodiment of the present disclosure proposes an array substrate 1 provided with a plurality of conductive bonding pads 10 distributed at intervals in the non-display area NA, wherein the conductive bonding pad 10 comprises a first metal layer 12, an insulating layer 13 and a conductive layer 14 sequentially formed on a first base substrate 11, the first metal layer 12 is in the same layer with and is electrically connected to the first common electrode 121 in the display area AA, the insulating layer 13 is provided with a plurality of vias 131 to electrically connect the conductive layer 14 to the first common electrode 121.

The via 131 is provided in a slit shape and is disposed at a predetermined angle from the first direction that is a direction in which the non-display area NA surrounds the display area AA. The conductive particle 161 in the sealant 16 is accommodated in the via 131 to connect the array substrate 1 and the color film substrate 2.

In some examples, the display area AA of the array substrate 1 is rectangular, and the non-display area NA surrounds the periphery of the display area AA. When the conductive bonding pad 10 is in the length direction of the array substrate 1, the surrounding direction is the length direction of the array substrate 1; when the conductive bonding pad 10 is in the width direction of the array substrate 1, the surrounding direction is the width direction of the array substrate 1.

In the display area AA, the array substrate 1 comprises the first metal layer 12, a gate insulating layer 13a, a semiconductor layer, a second metal layer, a passivation layer 13b, the conductive layer 14 and a first alignment film 15 sequentially formed on the first base substrate 11. The first metal layer 12 is provided with a scan line, a gate of a thin film transistor and a first common electrode 121, and the second metal layer is provided with a data line, and a source electrode and a drain electrode of the thin film transistor. The conductive layer 14 is provided with a pixel electrode. Either of the source electrode and the drain electrode is electrically connected to the data line, and the other of the source electrode and the drain electrode is electrically connected to the pixel electrode.

To simplify a fabrication process, each film layer of a plurality of the conductive bonding pads 10 in the non-display area NA of the array substrate 1 is fabricated simultaneously with the display area AA. The first metal layer 12 of the conductive bonding pad 10 is in the same layer with and electrically connected to the first common electrode 121, and the insulating layer 13 of the conductive bonding pad 10 may comprise the gate insulating layer 13a and the passivation layer 13b. By disposing the via 131 on the insulating layer 13, the conductive layer 14 may be electrically connected to the first common electrode 121.

Since the first alignment film 15 and the second alignment film 23 have flowability, viscosity thereof is reduced by adding a solvent to a resin material such as polyimide. Taking a manufacture process of the first alignment film 15 as an example, the first alignment film 15 is mainly fabricated in two ways, one of which is to transfer the first alignment film 15 with a printing plate, and the other of which is to fabricate the first alignment film 15 by a coating method of inkjet printing. Taking the inkjet printing method as an example, a graphic of the first alignment film 15 is first input into a computer, then a solution of the first alignment film 15 is sprayed onto the array substrate 1 through a spraying head, and the first alignment film 15 is formed after curing.

In order to prompt droplets of the first alignment film 15 to diffuse rapidly at a plurality of the conductive bonding pads 10, in this embodiment, the conductive bonding pad 10 is patterned, i.e., a plurality of the vias 131 in a slit shape distributed at intervals are disposed on the insulating layer 13. The insulating layer 13 between the adjacent two vias 131 is flat and thus readily causes the droplets of the first alignment film 15 to diffuse and overspread the non-display area NA, as shown by the direction of an arrow in FIG. 3. Since the via 131 is disposed at a predetermined angle from the first direction in which the non-display area NA surrounds the display area AA, the droplets of the first alignment film 15 do not directly enter the display area AA after diffusion from the flat insulating layer 13, preventing the droplets of the first alignment film 15 from accumulating at the edge of the display area AA.

In addition, the droplets of the first alignment film 15 may also diffuse directly from the conductive bonding pad 10 along the slit-shaped via 131, are not obstructed by other film layers during a droplet flowing process and thus do not accumulate, form a thin film layer after curing, may cause the conductive particle in the sealant 16 to puncture the thin first alignment film 15 formed on the via 131, and thus electrically connect the first common electrode 121 on one side of the array substrate 1 with the second common electrode 22 on one side of the color film substrate 2.

By patterning the conductive bonding pads 10 of the non-display area NA, i.e., providing a plurality of the vias 131 in a slit shape on the insulating layer 13, and disposing the via 131 at a predetermined angle from the first direction in which the non-display area NA surrounds the display area AA, the array substrate 1 according to an embodiment of the present disclosure can prompt the droplets of the first alignment film 15 to diffuse rapidly at the conductive bonding pad 10 of the non-display area NA, improve poor connection since the droplets of the first alignment film 15 accumulate at the vias to disable the conductive particle 161 in the sealant 16 to puncture the first alignment film 15, and improve a display effect.

In some examples, the predetermined angle α between the via 131 and the first direction has a range of $0 \leq \alpha < 90°$. When the conductive bonding pad 10 is in the length direction of the array substrate 1, the first direction is the length direction of the array substrate 1, and the via 131 is disposed at the predetermined angle α from the length direction of the array substrate 1. When the conductive bonding pad 10 is in the width direction of the array substrate 1, the first direction is the width direction of the array substrate 1, and the via 131 is disposed at the predetermined angle α from the width direction of the array substrate 1.

The range of the predetermined angle α of $0 \leq \alpha < 90°$ causes a diffusion path of the via 131 to be long to cause a diffusion channel formed between the two adjacent vias 131 to overspread the entire conductive bonding pad 10, meanwhile avoids the droplets of the first alignment film 15 flowing directly to the display area AA, causes the droplets of the first alignment film 15 to diffuse rapidly in the non-display area AA, and prevents the droplets of the first alignment film 15 from accumulating at the vias 131.

In some examples, a spacing between the two adjacent vias 131 is S, the width of the via 131 is W, and $S/(W+S) \geq 30\%$.

Figure 4:
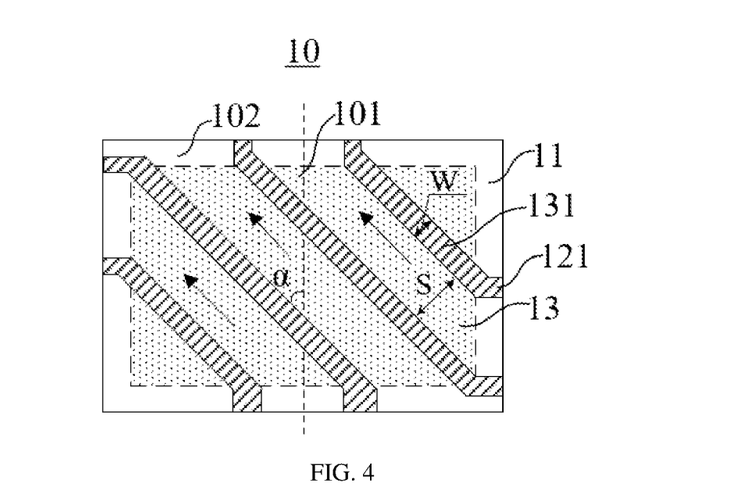
FIG. 4 is a structural diagram of a conductive bonding pad of an array substrate according to a second embodiment of the present disclosure.

As shown in FIGS. 3 and 4, since the sealant 16 is applied on the conductive bonding pad 10 and curing of the sealant 16 needs to be accelerated by ultraviolet illumination, the width of the via 131 needs to meet the curing requirements of the sealant 16 by ultraviolet light. If the via 131 is too narrow, the ultraviolet light cannot be irradiated into the via 131, so that the sealant 16 cannot be sufficiently cured. If the via 131 is too wide, a short circuit may occur between the conductive layer 14 and the first metal layer 12, affecting normal use of the conductive bonding pad 10. In some examples, the width of the via 131 W>14.5 µm.

In addition, the spacing S between the two adjacent vias 131 needs to meet manufacture process requirements. If the spacing S is too large, the number of the vias 131 is too small, which may affect connectivity of the first common electrode 121 on one side of the array substrate 1 with the second common electrode 22 on one side of the color film substrate 2; if the spacing S is too small, difficulty of the manufacture process is increased. In some examples, the spacing between the two adjacent vias 131 S>5.5 µm.

In some examples, when S/(W+S)≥30%, both the manufacture process requirements and the illumination curing requirements of the sealant 16 can be satisfied.

In some embodiments, the conductive bonding pad 10 comprises a plating area 101 and an edge area 102 on at least one side of the plating area 101, the insulating layer 13 and the conductive layer 14 are located in the plating area 101, the first metal layer 12 is laid in the plating area 101 and the edge area 102, and one side of the via 131 toward the edge area 102 is connected with the edge area 102.

As shown in FIGS. 2 and 4, the conductive bonding pad 10 comprises the plating area 101 and the edge area 102 on a peripheral side of the plating area 101, wherein the conductive layer 14 is laid in the plating area 101 and the edge area 102, which is not shown in this embodiment for ease of viewing the via 131. The first metal layer 12 is laid in the plating area 101 and the edge area 102, and since the first metal layer 12 of the plating area 101 is covered by the insulating layer 13 and the conductive layer 14, only the first metal layer 12 of the edge area 102 is exposed, i.e., a slash shade part is filled in FIG. 4. The insulating layer 13 is a part filled with dotted shade, and the via 131 is formed after a bar insulating block is dug out on the insulating layer 13. One side of the via 131 toward the edge area 102 is connected with the edge area 102, i.e., the via 131 is exposed to the first metal layer 12, the first metal layer 12 is in the same layer with and is electrically connected to the first common electrode 121 of the display area AA, so that the conductive particle 161 accommodated in the via 131 is in contact with the first metal layer 12 and is connected with the first common electrode 121. The other side of the conductive particle 161 is electrically connected to the second common electrode 22 through the second alignment film 23 on one side of the color film substrate 2, thereby turning on the liquid crystal display panel.

In addition, the smaller the number of the vias 131, the smaller a contact area of the conductive particles 161 in the sealant 16 with the first metal layer 12 and the greater resistance, which may affect conductivity of the conductive bonding pad 10. The number of the vias 131 needs to consider factors such as the width of the via 131, which depends on particular design requirements and will not be described.

Second Embodiment

FIG. 4 is a structural diagram of a conductive bonding pad of an array substrate according to a second embodiment of the present disclosure.

As shown in FIG. 4, the second embodiment of the present disclosure proposes a conductive bonding pad 10 of the array substrate 1, which has a structure similar to the structure of the conductive bonding pad 10 of the array substrate 1 according to the first embodiment, except that an edge structure of the conductive bonding pad 10 is different.

In some embodiments, the conductive bonding pad 10 comprises a plating area 101 and an edge area 102 on at least one side of the plating area 101, an insulating layer 13 and a conductive layer 14 are located in the plating area 101, and a first common electrode 121 extends from the display area AA to the edge area 102 of the non-display area NA and is electrically connected to a first metal layer 12 to which a via 131 is exposed.

As shown in FIG. 4, the conductive bonding pad 10 comprises the plating area 101 and the edge area 102 on a peripheral side of the plating area 101, wherein the conductive layer 14 is laid in the plating area 101 and the edge area 102, which is not shown in this embodiment for ease of viewing the via 131. The first metal layer 12 is laid in the plating area 101 and the edge area 102, and since the first metal layer 12 of the plating area 101 is covered by the insulating layer 13 and the conductive layer 14, only the first common electrode 121 of the edge area 102 is exposed, i.e., a slash shade part is filled in FIG. 4. The insulating layer 13 is a part filled with dotted shade, the via 131 is formed after a bar insulating block is dug out on the insulating layer 13, and a part filled with nothing is a first base substrate 11. The first metal layer 12 is laid in the plating area 101, the edge area 102 is provided with a first common electrode 121 extending from the display area AA to the non-display area NA, the first common electrode 121 is electrically connected to the first metal layer 12 where the via 131 is exposed in the plating area 101, so that a conductive particle 161 accommodated in the via 131 is directly connected with the first common electrode 121. The other side of the conductive particle 161 is electrically connected to the second common electrode 22 through the second alignment film 23 on one side of the color film substrate 2, thereby turning on the liquid crystal display panel.

Third Embodiment

Figure 5:
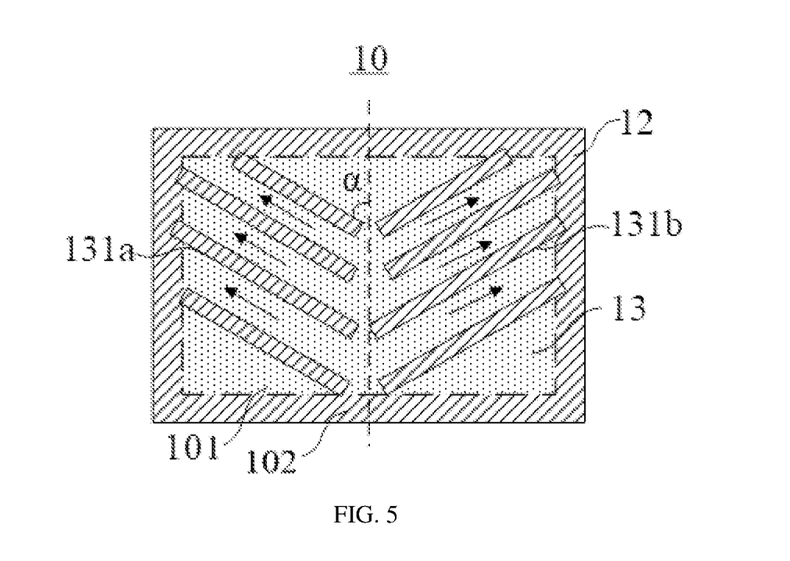
FIG. 5 is a structural diagram of a conductive bonding pad of an array substrate according to a third embodiment of the present disclosure.

FIG. 5 is a structural diagram of a conductive bonding pad of an array substrate according to a third embodiment of the present disclosure.

As shown in FIG. 5, the third embodiment of the present disclosure proposes a conductive bonding pad 10 of the array substrate 1, which has a structure similar to the structure of the conductive bonding pad 10 of the array substrate 1 according to the first embodiment, except that a via shape of the conductive bonding pad 10 is different, i.e., the via 131 is disposed in a "V"-shaped structure.

In some embodiments, the via 131 comprises a first via 131a and a second via 131b, the first via 131a and the second via 131b are disposed symmetrically with respect to a center line of the conductive bonding pad 10 in a second direction which is perpendicular to the first direction.

In this embodiment, the second direction of the conductive bonding pad 10 is a direction perpendicular to the direction in which the non-display area NA surrounds the display area AA. When the conductive bonding pad 10 is in the length direction of the array substrate 1, the first direction is the length direction of the array substrate 1, and the second direction is the width direction of the array substrate 1. When the conductive bonding pad 10 is in the width direction of the array substrate 1, the first direction is the width direction of the array substrate 1, and the second direction is the length direction of the array substrate 1. That is, the second direction is a direction in which the array substrate 1 is directed from the display area AA to the non-display area NA.

When the first alignment film 15 is prepared, the droplets of the first alignment film 15 may de dropped onto a central position of the conductive bonding pad 10, and then the droplets may diffuse respectively along the first via 131*a*, the second via 131*b*, a first channel formed between the adjacent first vias 131*a* and a second channel formed between the adjacent second vias 131*b*, as shown by arrow directions in FIG. 5, thereby accelerating a flow rate and diffusion uniformity of the droplets and preventing the droplets of the first alignment film 15 from being obstructed and accumulating in the first via 131*a* and the second via 131*b*.

Fourth Embodiment

Figure 6:
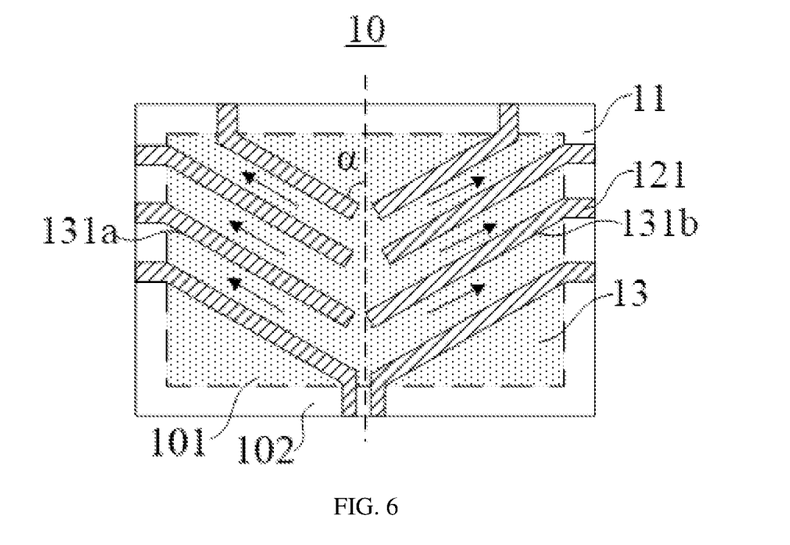
FIG. 6 is a structural diagram of a conductive bonding pad of an array substrate according to a fourth embodiment of the present disclosure.

FIG. 6 is a structural diagram of a conductive bonding pad of an array substrate according to a fourth embodiment of the present disclosure.

As shown in FIG. 6, the fourth embodiment of the present disclosure proposes a conductive bonding pad 10 of the array substrate 1, which has a structure similar to the structure of the conductive bonding pad 10 of the array substrate 1 according to the third embodiment, except that an edge structure of the conductive bonding pad 10 is different.

In some embodiments, the conductive bonding pad 10 comprises a plating area 101 and an edge area 102 on at least one side of the plating area 101, an insulating layer 13 and a conductive layer 14 are located in the plating area 101, and a first common electrode 121 extends from the display area AA to the edge area 102 of the non-display area NA and is electrically connected to a first metal layer 12 to which a via 131 is exposed.

As shown in FIG. 6, the conductive bonding pad 10 comprises the plating area 101 and the edge area 102 on a peripheral side of the plating area 101, wherein the conductive layer 14 is laid in the plating area 101 and the edge area 102, which is not shown in this embodiment for ease of viewing the via 131. The first metal layer 12 is laid in the plating area 101 and the edge area 102, and since the first metal layer 12 of the plating area 101 is covered by the insulating layer 13 and the conductive layer 14, only the first common electrode 121 of the edge area 102 is exposed, i.e., a slash shade part is filled in FIG. 6. The insulating layer 13 is a part filled with dotted shade, the via 131 is formed after a bar insulating block is dug out on the insulating layer 13, and a part filled with nothing is a first base substrate 11. The first metal layer 12 is laid in the plating area 101, the edge area 102 is provided with a first common electrode 121 extending from the display area AA to the non-display area NA. The via 131 comprises the first via 131*a* and the second via 131*b*, and the first via 131*a* and the second via 131*b* are disposed symmetrically with respect to a center line of the conductive bonding pad 10 in the second direction.

The first common electrode 121 is electrically connected to the first metal layer 12 where the first via 131*a* and the second via 131*b* are exposed in the plating area 101 respectively, so that the conductive particle 161 accommodated in the via 131 is directly connected with the first common electrode 121. The other side of the conductive particle 161 is electrically connected to the second common electrode 22 through the second alignment film 23 on one side of the color film substrate 2, thereby turning on the liquid crystal display panel.

Fifth Embodiment

Figure 7:
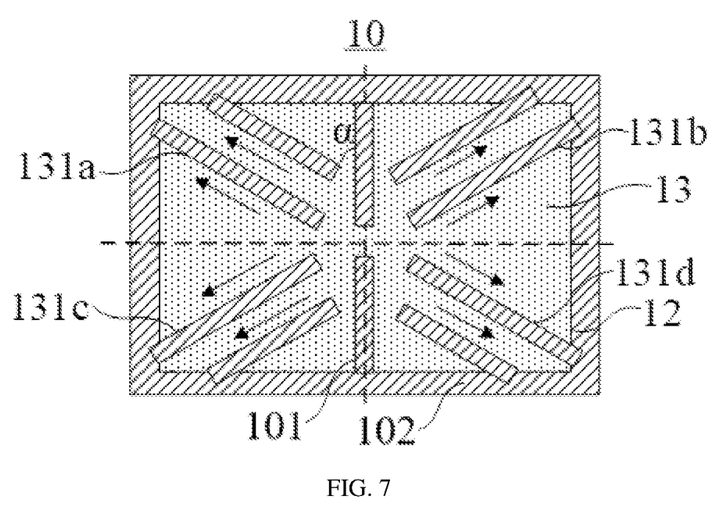
FIG. 7 is a structural diagram of a conductive bonding pad of an array substrate according to a fifth embodiment of the present disclosure.

FIG. 7 is a structural diagram of a conductive bonding pad of an array substrate according to a fifth embodiment of the present disclosure.

As shown in FIG. 7, the fifth embodiment of the present disclosure proposes a conductive bonding pad 10 of the array substrate 1, which has a structure similar to the structure of the conductive bonding pad 10 of the array substrate 1 according to the third embodiment, except that a via shape of the conductive bonding pad 10 is different, i.e., the via 131 is disposed in a "✻"-shaped structure.

In some embodiments, as shown in FIG. 7, the via 131 comprises a first via 131*a*, a second via 131*b*, a third via 131*c*, and a fourth via 131*d*, the first via 131*a* and the second via 131*b* are disposed symmetrically with respect to a center line of the conductive bonding pad 10 in a second direction, the third via 131*c* and the first via 131*a* are disposed symmetrically with respect to a center line of the conductive bonding pad 10 in a first direction, and the fourth via 131*d* and the second via 131*b* are disposed symmetrically with respect to the center line of the conductive bonding pad 10 in the first direction.

In this embodiment, the first direction of the conductive bonding pad 10 is a direction in which the non-display area NA surrounds the display area AA, and the first direction is perpendicular to the second direction. That is, the second direction is a direction in which the array substrate 1 is directed from the display area AA to the non-display area NA.

When the first alignment film 15 is prepared, the droplets of the first alignment film 15 may de dropped onto a central position of the conductive bonding pad 10, and then the droplets may diffuse respectively along the first via 131*a*, the second via 131*b*, the third via 131*c*, the fourth via 131*d*, a first channel formed between the adjacent first vias 131*a*, a second channel formed between the adjacent second vias 131*b*, a third channel formed between the adjacent third vias 131*c*, and a fourth channel formed between the adjacent fourth vias 131*d* as shown by arrow directions in FIG. 7, thereby further accelerating a flow rate and diffusion uniformity of the droplets and preventing the droplets of the first alignment film 15 from being obstructed and accumulating in the first via 131*a* and the second via 131*b*.

Sixth Embodiment

Figure 8:
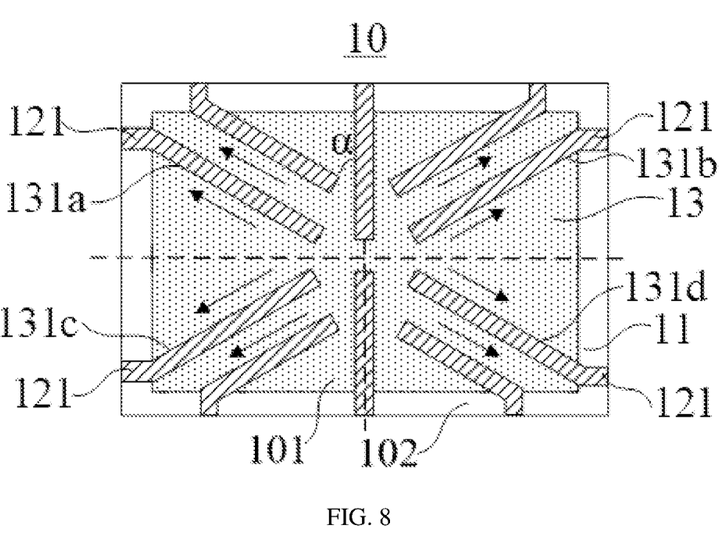
FIG. 8 is a structural diagram of a conductive bonding pad of an array substrate according to a sixth embodiment of the present disclosure.

FIG. 8 is a structural diagram of a conductive bonding pad of an array substrate according to a sixth embodiment of the present disclosure.

As shown in FIG. 8, the sixth embodiment of the present disclosure proposes a conductive bonding pad 10 of the array substrate 1, which has a structure similar to the structure of the conductive bonding pad 10 of the array substrate 1 according to the fifth embodiment, except that an edge structure of the conductive bonding pad 10 is different.

In some embodiments, the conductive bonding pad 10 comprises the plating area 101 and the edge area 102 on at least one side of the plating area 101. Wherein, the conductive layer 14 is laid in the plating area 101 and the edge area 102, which is not shown in this embodiment for ease of viewing the via 131. The first metal layer 12 is laid in the plating area 101 and the edge area 102, and since the first metal layer 12 of the plating area 101 is covered by the insulating layer 13 and the conductive layer 14, only the first common electrode 121 of the edge area 102 is exposed, i.e., a slash shade part is filled in FIG. 6. The insulating layer 13 is a part filled with dotted shade, the via 131 is formed after a bar insulating block is dug out on the insulating layer 13, and a part filled with nothing is a first base substrate 11. The insulating layer 13 and the conductive layer 14 are located in the plating area 101, the edge area 102 is provided with a first common electrode 121 extending from the display area AA to the non-display area NA, and the first common electrode 121 is electrically connected to the first metal layer 12 in which the via 131 is exposed.

The via 131 comprises a first via 131a, a second via 131b, a third via 131c, and a fourth via 131d, the first via 131a and the second via 131b are disposed symmetrically with respect to a center line of the conductive bonding pad 10 in a first direction, the third via 131c and the first via 131a are disposed symmetrically with respect to a center line of the conductive bonding pad 10 in a second direction, and the fourth via 131d and the second via 131b are disposed symmetrically with respect to the center line of the conductive bonding pad 10 in the second direction.

The first common electrode 121 is electrically connected to the first metal layer 12 where the first via 131a, the second via 131b, the third via 131c and the fourth via 131d are exposed in the plating area 101 respectively, so that the conductive particle 161 accommodated in the via 131 is directly connected with the first common electrode 121. The other side of the conductive particle 161 is electrically connected to the second common electrode 22 through the second alignment film 23 on one side of the color film substrate 2, thereby turning on the liquid crystal display panel.

It can be understood that the technical solutions of the array substrate 1 according to embodiments of the present disclosure may be widely used in a variety of liquid crystal display panels, such as TN (Twisted Nematic) display panels, IPS (In-Plane Switching) display panels, VA (Vertical Alignment) display panels and MVA (Multi-Domain Vertical Alignment) display panels.

It should be readily understood that the terms "on", "upon" and "above" in the disclosure should be interpreted in a broadest manner such that "on" not only means "directly on something", but also means "above something" and there is an intermediate feature or layer, and "upon" or "above" not only means "upon something" or "above something", but also means "upon something" or "above something" and there is no intermediate feature or layer (i.e., directly on something).

As used herein, the term "base substrate" refers to a material on which a subsequent material layer is added. The base substrate itself may be patterned. The material added onto the base substrate may be patterned or may remain unpatterned. Further, the base substrate may comprise a wide range of materials such as silicon, germanium, gallium arsenide and indium phosphide. Alternatively, the base substrate may be made of a non-conductive material (e. g., glass, plastic, or sapphire wafer).

As used herein, the term "layer" may refer to a material part that comprises a region having a thickness. The layer may extend over the entire underlying structure or overlying structure or may have an extent smaller than an extent of the underlying or overlying structure. In addition, the layer may be a region of a homogeneous or non-homogeneous continuous structure having a thickness smaller than a thickness of the continuous structure. For embodiment, a layer may be located between top and bottom surfaces of the continuous structure or between any pair of lateral planes at the top and bottom surfaces. The layer may extend laterally, vertically, and/or along a tapered surface. The base substrate may be a layer, may comprise one or more layers, and/or may have one or more layers thereon, thereabove and/or therebelow. A layer may comprise a plurality of layers. For embodiment, an interconnected layer may comprise one or more conductors and contact layers (in which contacts, interconnecting lines, and/or vias are formed) as well as one or more dielectric layers.

At last, it should be noted that: the above embodiments are only used to illustrate the technical solutions of the present disclosure, rather than limiting the disclosure; although the present disclosure has been described in detail with reference to the foregoing embodiments, those skilled in the art should understand that it is still possible to modify the technical solutions described in the foregoing embodiments or equivalently substitute some or all of the technical features; however, these modifications or substitutions will not depart from the scope of the technical solutions of the embodiments of the present disclosure.

What is claimed is:

1. An array substrate for a liquid crystal display panel, comprising a display area and a non-display area at a periphery of the display area, wherein
the array substrate is provided with a plurality of conductive bonding pads distributed at intervals in the non-display area, in which the conductive bonding pad comprises a first metal layer, an insulating layer and a conductive layer sequentially formed on a first base substrate, in which the first metal layer is in the same layer with and is electrically connected to a first common electrode in the display area, and the insulating layer is provided with a plurality of vias to electrically connect the conductive layer to the first common electrode, in which the via is provided in a slit shape and is disposed at a predetermined angle from a first direction in which the non-display area surrounds the display area.

2. The array substrate of claim 1, wherein the predetermined angle $\alpha$ between the via and the first direction has a range of $0 \leq \alpha < 90°$.

3. The array substrate of claim 1, wherein a spacing between the two adjacent vias is S, a width of the via is W, and $S/(W+S) \geq 30\%$.

4. The array substrate of claim 3, wherein the spacing between the two adjacent vias $S > 5.5$ μm; or
the width of the via $W > 14.5$ μm.

5. The array substrate of claim 3, wherein the spacing between the two adjacent vias $S > 5.5$ μm; and
the width of the via $W > 14.5$ μm.

6. The array substrate of claim 1, wherein the via comprises a first via and a second via, the first via and the second via are disposed symmetrically with respect to a center line of the conductive bonding pad in a second direction which is perpendicular to the first direction.

7. The array substrate of claim 6, wherein the via further comprises a third via and a fourth via, the third via and the first via are disposed symmetrically with respect to a center line of the conductive bonding pad in the first direction, and the fourth via and the second via are disposed symmetrically with respect to the center line of the conductive bonding pad in the first direction.

8. The array substrate of claim 6, wherein the second direction is a direction from the display area to the non-display area.

9. The array substrate of claim 8, wherein the display area is rectangular, and when the conductive bonding pad is in a length direction of the array substrate, the first direction is the length direction of the array substrate, and the second direction is a width direction of the array substrate.

10. The array substrate of claim 8, wherein the display area is rectangular, and when the conductive bonding pad is in a width direction of the array substrate, the first direction is the width direction of the array substrate, and the second direction is a length direction of the array substrate.

11. The array substrate of claim 1, wherein the conductive bonding pad comprises a plating area and an edge area on at least one side of the plating area, the insulating layer and the conductive layer are located in the plating area, the first metal layer is laid in the plating area and the edge area, and one side of the via toward the edge area is connected with the edge area.

12. The array substrate of claim 1, wherein the conductive bonding pad comprises a plating area and an edge area on at least one side of the plating area, the insulating layer and the conductive layer are located in the plating area, the first common electrode extends from the display area to the edge area of the non-display area and is electrically connected to the first metal layer to which the via is exposed.

13. The array substrate of claim 1, further comprising a first alignment film on a side of the conductive layer away from the first base substrate and a sealant provided with a conductive particle, wherein the conductive particle is accommodated in the via, one end of the conductive particle is electrically connected to the first common electrode through the first alignment film, and the other end of the conductive particle is electrically connected to a second common electrode through a second alignment film on a color film substrate side of the liquid crystal display panel.

14. The array substrate of claim 13, wherein a glass fiber is dispersed in the sealant, an outer diameter of the conductive particle is 5 μm, and a diameter of the glass fiber is 4 μm.

15. The array substrate of claim 13, wherein a line width of the sealant is 0.5 mm.

16. The array substrate of claim 1, wherein in the display area, the array substrate comprises a first metal layer, a gate insulating layer, a semiconductor layer, a second metal layer, a passivation layer, a conductive layer and a first alignment film sequentially formed on the first base substrate; the first metal layer is provided with a scan line, a gate of a thin film transistor and a first common electrode, the second metal layer is provided with a data line, and a source electrode and a drain electrode of the thin film transistor, and the conductive layer is provided with a pixel electrode; either of the source electrode and the drain electrode is electrically connected to the data line, and the other of the source electrode and the drain electrode is electrically connected to the pixel electrode.

17. The array substrate of claim 16, where an insulating layer of the conductive bonding pad is disposed correspondingly to the gate insulating layer and the passivation layer.

18. A liquid crystal display panel comprising a display area and a non-display area at a periphery of the display area, comprising:
  an array substrate provided with a plurality of conductive bonding pads distributed at intervals in the non-display area, in which the conductive bonding pad comprises a first metal layer, an insulating layer and a conductive layer sequentially formed on a first base substrate, in which the first metal layer is in the same layer with and is electrically connected to a first common electrode in the display area, and the insulating layer is provided with a plurality of vias to electrically connect the conductive layer to the first common electrode, in which the via is provided in a slit shape and is disposed at a predetermined angle from a first direction in which the non-display area surrounds the display area;
  a color film substrate disposed opposite the array substrate; and
  a liquid crystal layer disposed between the array substrate and the color film substrate.

\* \* \* \* \*